April 26, 1960

A. S. ILDAHL 2,934,244

APPARATUS FOR CONTINUOUS PROPORTIONING
OF A LIQUID OR A LIQUID SUSPENSION

Filed Feb. 10, 1958

INVENTOR
AAGE STORM ILDAHL
BY
Irwin S. Thompson
ATTORNEY

April 26, 1960
A. S. ILDAHL
2,934,244
APPARATUS FOR CONTINUOUS PROPORTIONING
OF A LIQUID OR A LIQUID SUSPENSION
Filed Feb. 10, 1958
2 Sheets-Sheet 2
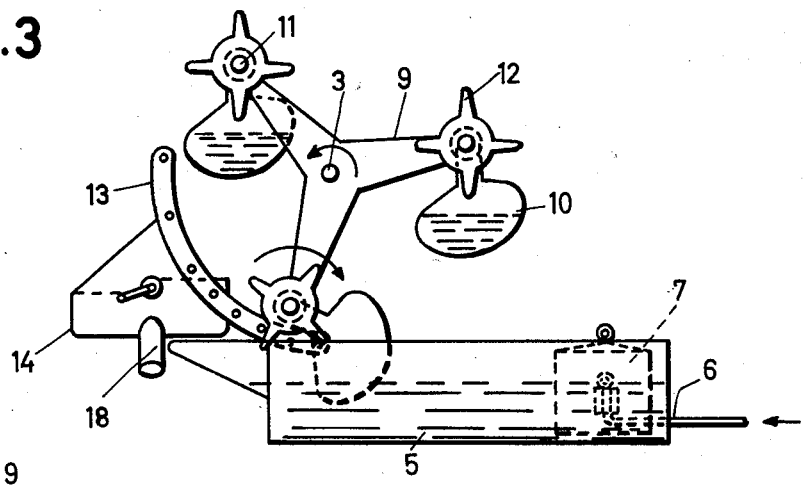
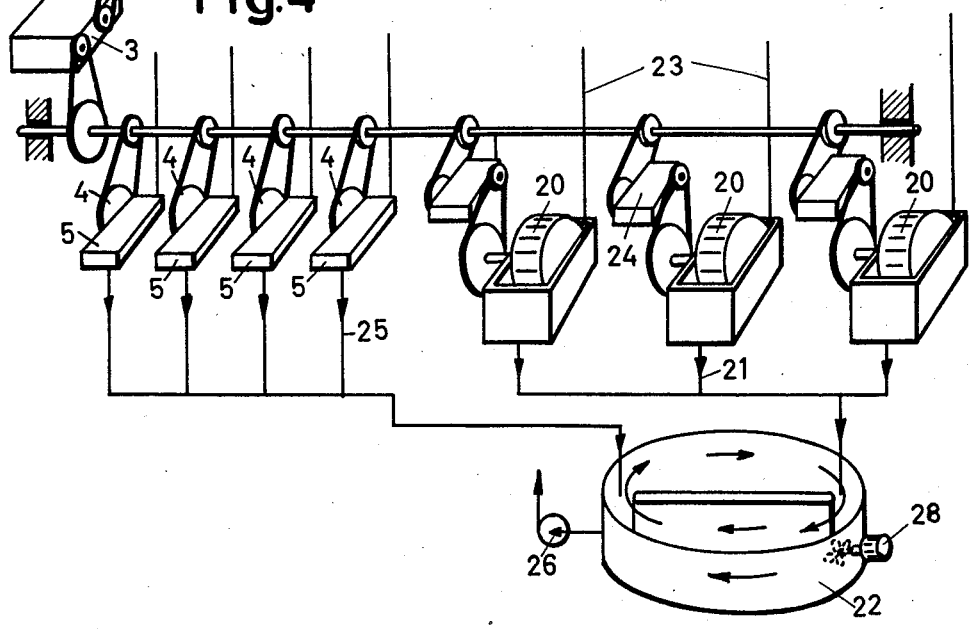
INVENTOR
*AAGE STORM ILDAHL*
BY
*Irwin S. Thompson*
ATTORNEY United States Patent Office 2,934,244
Patented Apr. 26, 1960

2,934,244

APPARATUS FOR CONTINUOUS PROPORTIONING OF A LIQUID OR A LIQUID SUSPENSION

Aage Storm Ildahl, Halden, Norway, assignor to S. Haug Ellingsen & Co., Oslo, Norway Application February 10, 1958, Serial No. 714,407

4 Claims. (Cl. 222—310)

The present invention relates to an apparatus for continuous proportioning of a liquid or a liquid suspension, particularly for use in plants of the wood conversion industry, in which a mixture of one or more portions of pulp continuously are to be mixed with exactly proportioned quantities of different liquids. One or more apparatuses for pulp proportioning and a number of apparatuses for liquid proportioning may be driven by a common driving shaft, the apparatuses being supplied with pulp and liquid respectively, which are to be proportioned each from one separate supply conduit.

Different methods and means for proportioning of liquid are known, but the object of the invention is to provide a simple apparatus which is particularly adapted for the purpose above mentioned, and which by simple means may be adjusted so as to be able to proportion the same quantity at different speeds of the driving shaft, or so as to be able to proportion different large quantities at the same speed of the driving shaft.

According to the invention in an apparatus of the kind described and comprising a vessel into which the liquid to be proportioned is emptied, the said vessel is divided in two compartments by means of an adjustable partition wall, the position of which determines the liquid quantity to be proportioned, the said liquid quantity being supplied to the one compartment which has outlet for the proportioned liquid quantities, while the second compartment has outlet for the remaining liquid back to the receptacle or the like from which the liquid emptied into the vessel has been taken.

Further according to the invention the apparatus comprises a number of scoops, which are swingably suspended each between the arms of a corresponding number of armpairs, which are secured to a common driving shaft, the said scoops being adapted to during the rotation of the armpairs, on the one hand to be filled from a receptacle or the like, which contains the liquid to be proportioned, and on the other hand to empty the liquid into the said vessel.

Each scoop is rigidly connected with a shaft, which is rotatably mounted in the arms and carries a star-shaped wheel adapted to, during the rotation of the armpairs, to be engaged by a segment which is provided with corresponding teeth and mounted in association with said receptacle in such a way that the scoop is swung entirely around and is filled and emptied during one and the same movement of 360° about its axis of rotation.

An apparatus according to the invention and its use is described in the following with reference to the drawing, in which:

Figures 2 and 3 illustrate diagrammatically the operation of the apparatus in two different positions respectively of the said armpairs.

Figure 4 is a diagrammatical sketch of a system in association with which a number of apparatuses according to the invention are used.

Figure 1:
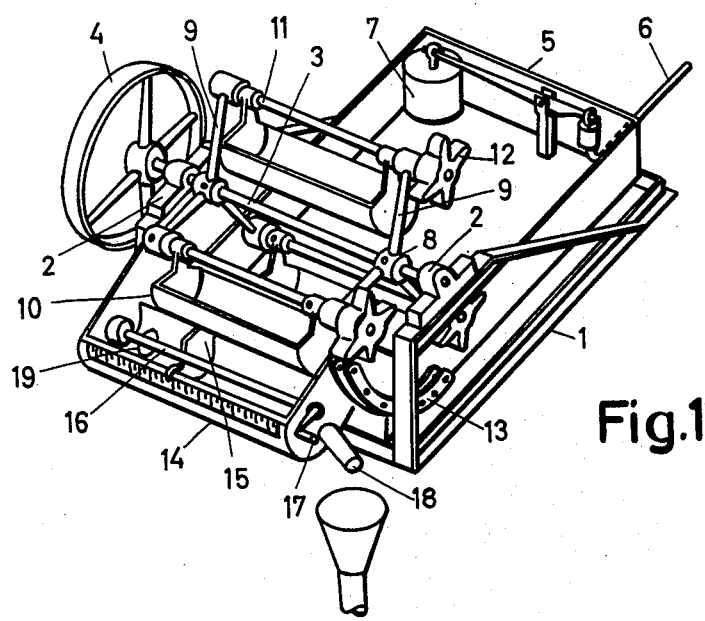
Figure 1 is a perspective view of the apparatus.

In Fig. 1, 1 designates a frame, having on each side a bearing support 2 for a driving shaft 3, with a driving wheel 4. 5 designates the receptacle to which the liquid to be proportioned is supplied through the conduit 6. 7 designates a float valve which operates to maintain a constant liquid level in the receptacle.

In the example shown two hubs 8 are secured to the shaft 3, and three arms 9 are secured to each of the hubs 8 and equally angularly spaced, so that three armpairs are formed. A scoop 10 is suspended between the arms 9 of each armpair, and is rigidly connected with a shaft 11 which is rotatably mounted in the ends of the arms. In the one end of the shaft 11 outside the arm a star-shaped wheel 12 is secured.

A segment 13 is secured to the frame 1 at the same side as the star wheel 12, the said segment 13 being provided with teeth adapted to cooperate with the prongs of the wheel 12. 14 designates the vessel into which the liquid to be proportioned is emptied. This vessel is provided with a tightly sealing, adjustable partition wall 15, which is parallel with the end surface of the vessel and divides the vessel in two compartments. By means of a threaded spindle 16, which is rotatably supported in the two end faces of the vessel and an internally threaded sleeve, which fits the thread of the spindle and is secured in the partition wall, the partition wall can by means of a crank 17 be adjusted along a scale at any place within the end walls of the vessel.

Figure 2:
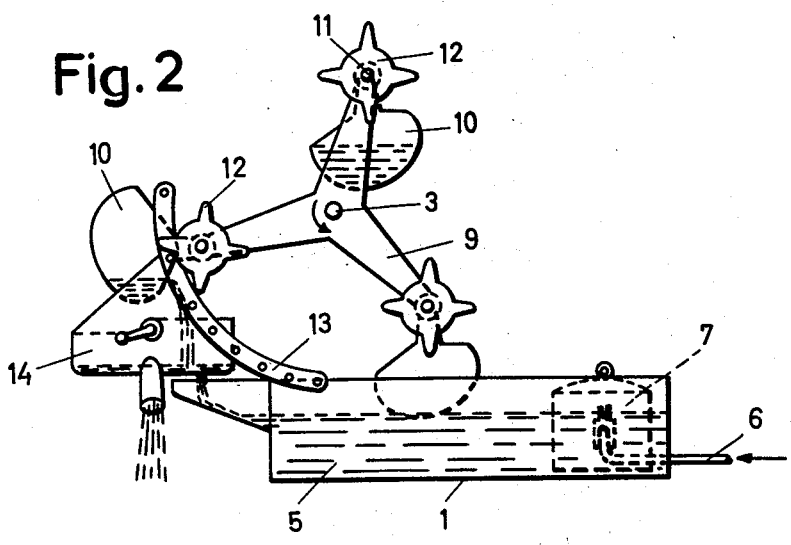

With reference to Figures 2 and 3 the apparatus above described operates in the following way:

When the driving shaft 3 is rotated, the star wheel 12, which has four prongs will engage the teeth of the toothed segment 13, whereby the shaft 11 will be rotated and the scoop 10 swung 360° about its own axis in the opposite direction of the direction in which the driving shaft 3 rotates before the star wheel 12 leaves the segment 13. As a result thereof the scoop which is filled with liquid empties its contents completely into the vessel 14, which is located higher than the liquid level of the receptacle before the scoop in the last phase of its positive movement carefully swings down below the liquid level of the receptacle in order to be filled anew. After the star wheel has left the toothed segment the scoop is again filled with liquid and hangs freely, being only influenced by the force of gravity, which retains the scoop in a vertical position during the rotation of the driving shaft 3, until the star wheel on the shaft of the scoop again engages the toothed segment and is forced to turn 360° about its suspension axis.

The liquid film which due to the special shape of the scoop is formed when the liquid is poured from the scoop down into the vessel, is divided in two parts by the partition wall 15 in the vessel 14, and the liquid which is collected on the one side of the partition wall is conducted out from the apparatus through a discharge pipe 18 in the end wall of the vessel, while the liquid on the other side of the partition wall is conducted back to the receptacle through the hole 19 in the bottom of the vessel (see also Figure 1).

As mentioned, Figure 4 is a diagrammatical sketch which shows a system in which a number of apparatuses as above described, are used. In this figure 20 designates apparatuses for pulp proportioning with outlet 21 to a circulation basin 22. Supply conduits for pulp are indicated at 23. The liquid proportioning apparatuses are indicated at the receptacle 5, which through a chain transmission are driven by the driving shaft 3, which is common both for the pulp proportioning apparatuses and for the liquid proportioning apparatuses. 24 designates variable transmissions for individual speed changes of the pulp proportioning apparatuses.

25 designates the discharge outlets from the different liquid proportioning apparatuses to the circulation basin 22. 26 designates a pump which pumps a mixture of correct quantities of each pulp sort and liquid sort out to the place of destination.

It will be understood that at a certain speed of the driving shaft one can by means of the apparatus described, continuously proportion any desired liquid quantity between zero and the maximum delivering capacity of the apparatus, and when the speed of the driving shaft is varied the adjusted proportioning quantity is increased or decreased direct proportional with the speed.

The advantages and possibilities of the apparatus make themselves most evident when a number of apparatuses as shown in Figure 4 are connected together for operation from a common driving shaft and a liquid mixture consisting of certain quantities of different liquids is desired. The relation between the liquids in the mixture is always the same independent of the speed of the driving shaft.

In Figure 4 a circulation pump in association with the circulation basin 22 is indicated at 28. 29 designates a driving motor and 30 a variable transmission for driving the shaft 3. The speed of the driving shaft 3 is determined by the level in the circulation basin.

Although a number of armpairs have been referred to in the above description it will be understood that the invention also may be carried out when only one scoop and only one armpair is provided, and the invention also comprises such an embodiment.

I claim:

1. An apparatus for continuous proportioning of a liquid or a liquid suspension, particularly for use where a mixture of one or more portions of pulp is to be mixed with exact proportions of different liquids, comprising a supply receptacle, a vessel into which the liquid to be proportioned is emptied, an adjustable partition wall dividing the vessel into two compartments, one compartment having an outlet for the proportioned liquid quantities, the second compartment having an outlet conducting the remaining liquid back to the supply receptacle, at least one scoop adapted to receive liquid from said receptacle and empty the same into said vessel, said scoop being rigidly connected to a shaft, bearings rotatably supporting said shaft, radial connecting members rigidly connected in spaced relationship to a common driving shaft and supporting said bearings, and means for rotating said scoop on its shaft in a direction opposite to the direction of rotation of said scoop by said driving shaft to empty said scoop and for causing said scoop to swing into the liquid in the supply receptacle while rotating about both said shafts.

2. The apparatus of claim 1, said means rotating said scoop through 360° on its shaft.

3. The apparatus of claim 1, said means comprising a star wheel fastened to said first shaft and a toothed segment mounted for engagement with said star wheel.

4. The apparatus of claim 3, and wherein the teeth of the segment first engaged by said star wheel are spaced a greater distance apart than the other teeth of said segment, whereby for a constant angular velocity of said drive shaft said scoop will rotate on its own shaft slowly during initial engagement of said star wheel and segment, and then more rapidly.

References Cited in the file of this patent

UNITED STATES PATENTS

| | | |
|---|---|---|
| 1,828,117 | Mallinckrodt | Oct. 20, 1931 |
| 2,295,258 | Cann | Sept. 8, 1942 |
| 2,401,345 | Finney | June 4, 1946 |
| 2,719,661 | Eisenberg | Oct. 4, 1955 |